July 1, 1969 P. J. BILY 3,452,787
OFFSHORE ARTICULATED FLUID CONVEYING APPARATUS
Filed Jan. 18, 1967 Sheet 2 of 3
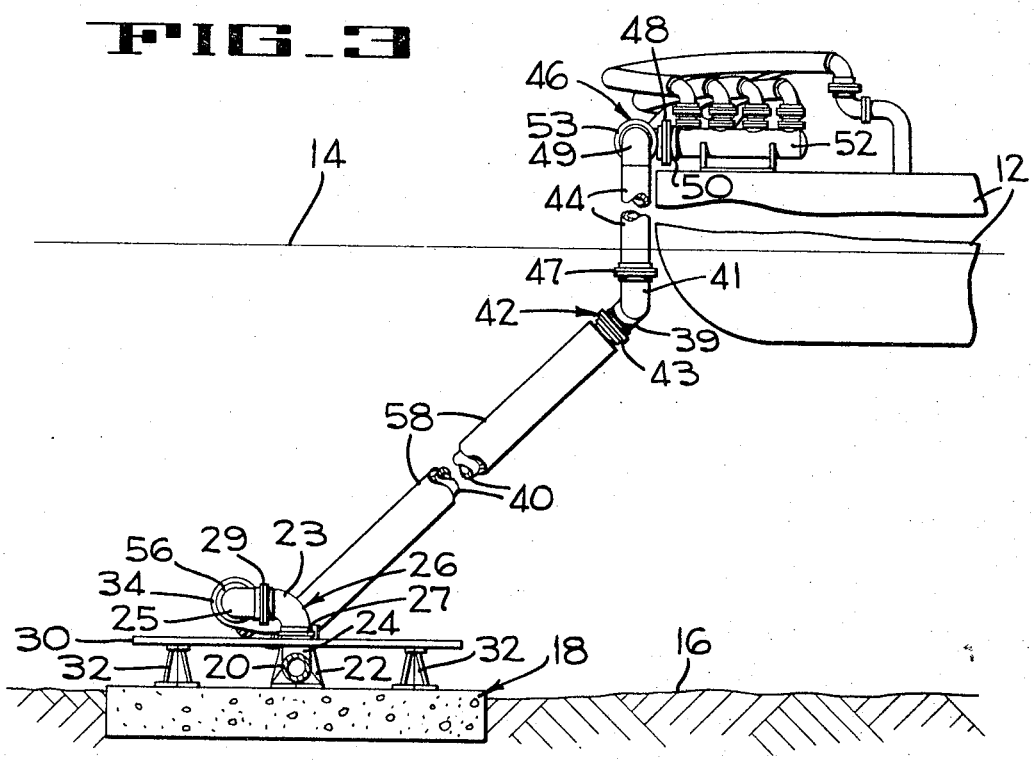
FIG_3
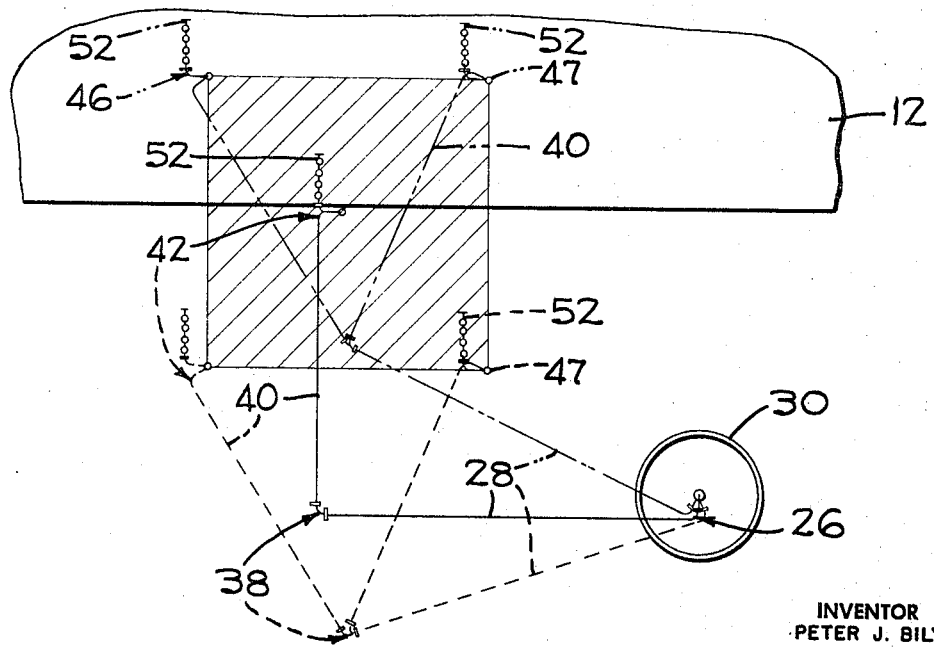
FIG_4
INVENTOR
PETER J. BILY
BY Francis W. Anderson
ATTORNEY

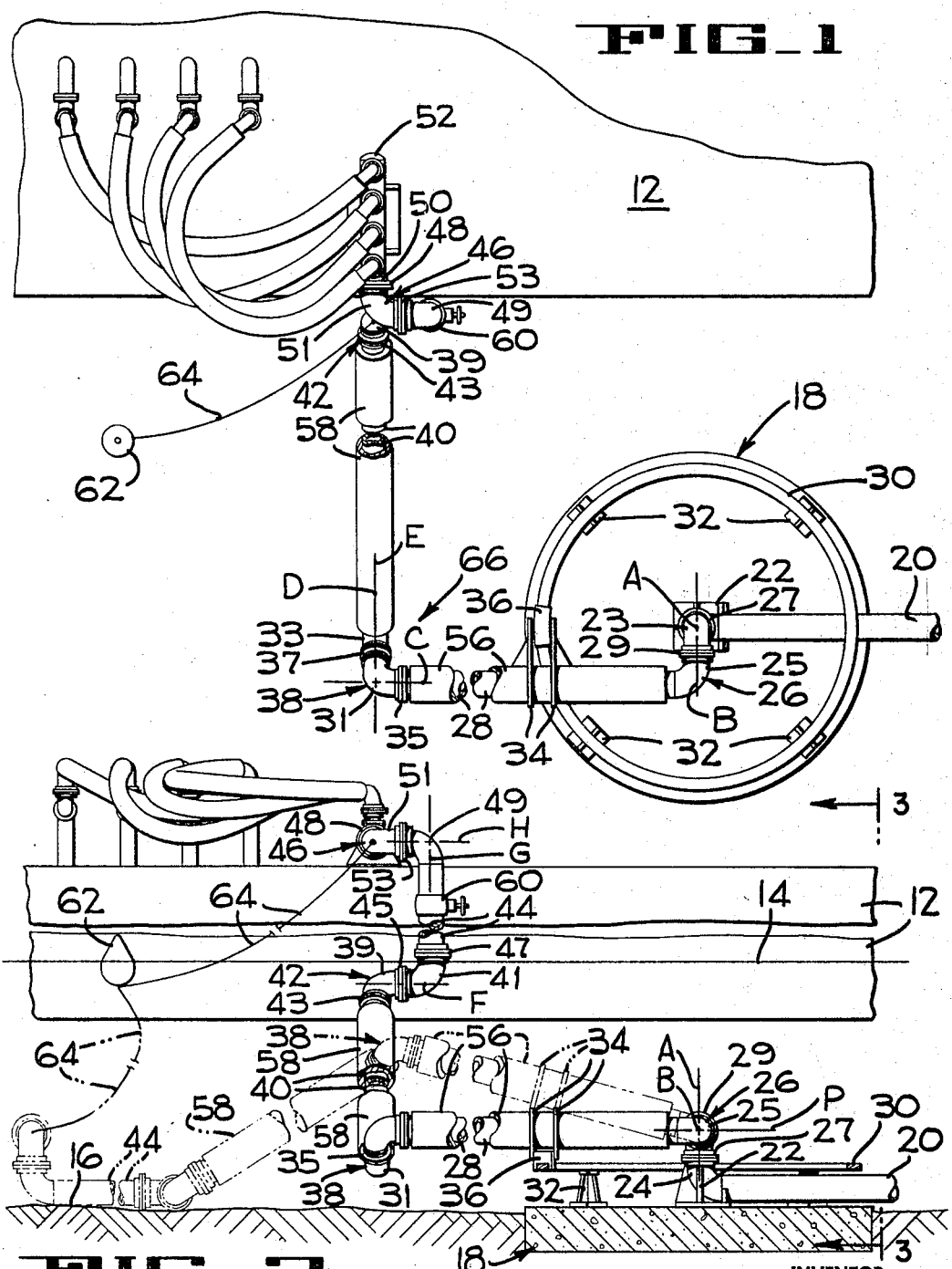

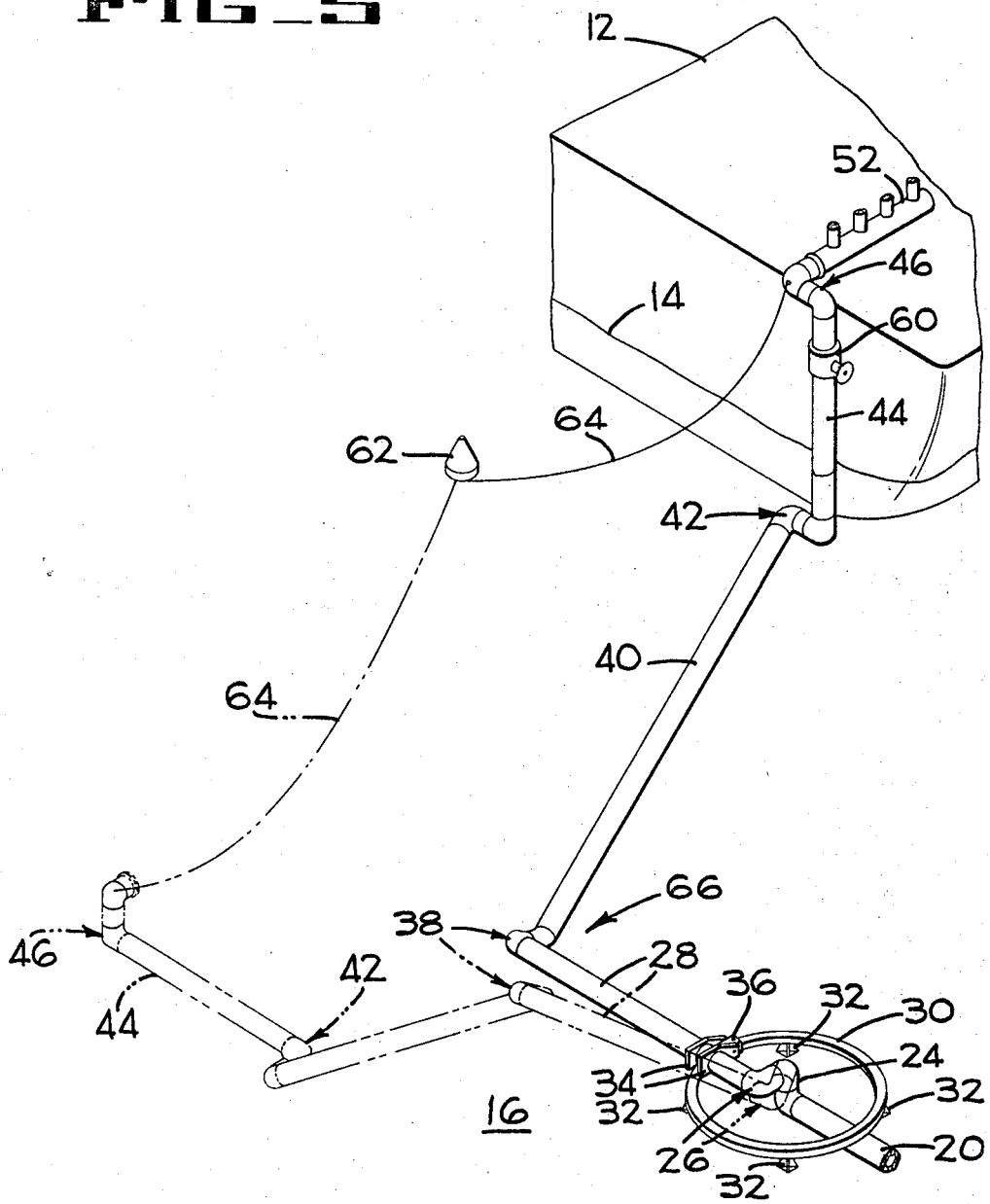

United States Patent Office 3,452,787
Patented July 1, 1969

3,452,787
OFFSHORE ARTICULATED FLUID CONVEYING APPARATUS
Peter J. Bily, Sunset Beach, Calif., assignor to FMC Corporation, San Jose, Calif., a corporation of Delaware
Filed Jan. 18, 1967, Ser. No. 610,136
Int. Cl. E03b 7/00; F17d 1/08
U.S. Cl. 141—388                    5 Claims

ABSTRACT OF THE DISCLOSURE

An offshore articulated fluid line is used to convey fluid between the end of an underwater fixed conduit extending from the shore and a vessel moored offshore. In order to facilitate handling of the line, and minimize contact thereof with, and burial on, the bed of the body of water, a pedestal lying on the bed has a fluid conducting universal coupling mounted centrally thereon, which is connected to the fixed conduit. A rigid conduit at one end of the articulated line is connected to the universal coupling and extends therefrom over a circular track on the pedestal which maintains the conduit above the bed. All of the rigid conduits of the line, except the terminal conduit which connects to a port on the vessel when the line is in use, have buoyant sheaths to float these conduits of the line above the bed of the body of water when the line is not in use.

---

This invention concerns an apparatus for conveying fluids between a floating vessel moored offshore and a submerged fixed fluid conveying conduit connected to an installation on shore, and, more particularly concerns an offshore submergible articulated fluid conveying apparatus.

It has been found highly desirable to load and unload hazardous or contaminating liquid between a floating vessel and a shore based storage facility by having the vessel moored offshore during the loading or unloading operation a sufficient distance so as to minimize or eliminate water pollution, collision, and explosion hazards. In addition, grounding hazards due to shallow water or narrow navigable channels are substantially eliminated by providing for loading and unloading of the vessel offshore where the water depth and channel width present no such hazards. Lack of docking facilities, or inadequate docking facilities, compels the use of offshore loading and unloading.

There has been developed, in the past, various systems and apparatus for conveying fluids such as petroleum, chemicals, and other fluids between a land-based storage facility and a floating vessel moored offshore. In one type of system, a fluid conveying fixed conduit is connected to a shore-based storage facility and extended a certain distance offshore on the ocean or sea bed beneath the surface of the water. At the submerged outer end of the fixed conduit there is coupled thereto a fluid conveying line. When the line is not in use, the outer end thereof lies on the ocean or sea bed with a cable from a buoy connected thereto. To use the line, a vessel moors adjacent the buoy and, by means of the cable connected to the buoy, raises the outer end of the fluid conveying line for connection to a connecting port on the vessel.

The fluid conveying line extending between the end of the fixed conduit and the vessel, which moves freely within the limits imposed by its moorings, must be flexible or articulated to accommodate the motion of the moored vessel. A flexible rubber hose becomes worn quickly from abrasive contact with the sandy or rocky ocean bed. Rigid conduits, connected in end-to-end relationship for swiveling action therebetween, have been used as an articulated fluid conveying line between the fixed conduit on the bed of the ocean and a moored vessel. Although the rigid conduit is more durable than rubber hose, it, too, is adversely affected by the abrasive action of the sand or rocks. The rigid conduit is also heavy, and the weight of the line magnifies the abrading action of the bed of the body of water as the line is dragged thereover. Powerful winches on the vessel are required for handling a heavy line, and large stresses are placed on the swivel joints between the rigid conduits of the articulated line when the line is raised. Moreover, shifting sand or silt tends to bury the line and makes handling thereof even more difficult.

In the apparatus of the present invention, wear on an articulated line extending between a fixed conduit and a moored vessel is minimized, and handling of the line is greatly facilitated. This is accomplished, in the preferred form of the invention, by providing a fixed pedestal on which the end of the fixed conduit is mounted. A universal fluid conveying coupling is connected to the end of the fixed conduit, and a circular track on the pedestal surrounds the coupling. A rigid conduit is connected to the coupling and extends therefrom above the track, which lies in a plane parallel to and spaced from the bed of the body of water. The remainder of the line is made up of rigid conduits which are connected in end-to-end relationship for swiveling therebetween. All of the rigid conduits, except the terminal conduit which is connected to the connecting port on a moored vessel when the line is in use, has a sheath of buoyant material. The buoyant sheaths float the conduits, reducing the wear thereof resulting from dragging motion on the bottom and facilitating the handling of the line by making some of the conduits thereof weightless. Stresses on the swivel joints of the articulated line are greatly reduced because of the reduced weight of the line, and any tendency of the line to become buried in the sand is minimized because of the buoyant condition of some of the conduits of the line. When the line is not in use, the terminal conduit keeps the line submerged to avoid damage from ships or other floating objects.

It is therefore one object of the present invention to reduce wear on an articulated fluid conveying line extending between a fixed conduit and a moored vessel. It is another object of the present invention to facilitate handling of an articulated fluid conveying line for loading or unloading an offshore vessel. It is yet another object of the present invention to reduce the tendency of an articulated line for a vessel moored offshore from becoming buried by shifting sand or silt. It is still another object of the present invention to provide a lighter, more easily handled, articulated fluid conveying line for connection to an offshore vessel.

In the drawings:

FIGURE 1 is a plan view of the apparatus of the present invention;

FIGURE 2 is a side elevation view of the apparatus of FIGURE 1, showing the apparatus when in use in solid lines and when not in use in dotted lines;

FIGURE 3 is a view taken on the line 3—3 of FIGURE 2;

FIGURE 4 is a schematic plan view of the apparatus of FIGURE 1 showing the positions assumed by the conduits in five different positions of the moored vessel including, in solid lines, the position of the line as shown in FIGURES 1, 2 and 3; and FIGURE 5 is a schematic perspective view of the apparatus of FIGURE 1 showing, in solid lines, the same positions assumed by the conduits as in FIGURE 2 when the apparatus is in use, and showing, in dotted lines, the same positions assumed by the conduits as in FIGURE 2 when the apparatus is not in use.

In the embodiment of the invention disclosed in the drawings, a moored vessel 12 is floating in a body of water 14 above the bed or floor 16 of the body of water. A pedestal 18 rests on, or is embedded in, the floor 16. A fixed fluid conveying conduit 20, which rests upon the floor 16, extends from a shore-based storage facility (not shown) or other suitable terminal to a point near the middle of the top surface of the pedestal 18. Adjacent the outer end of the fixed conduit 20, and attached to the pedestal 18, is a bracket 22 for supporting the 90° fluid-conducting elbow 24 which has an inner end firmly attached in fluid conveying relation to the outer end of conduit 20.

A swivel joint 26 comprising two 90° elbows 23 and 25 is rotatably mounted on the vertically upwardly extending outer end of elbow 24. The inner end of elbow 23 is coupled to the outer end of elbow 24 by means of a fluid tight rotatable connector 27, and the outer end of elbow 23 is coupled to the inner end of elbow 25 by means of a fluid tight rotatable connector 29. The swivel joint 26 thus defines a universal fluid conveying coupling which is rotatable, as a unit, about an axis A extending vertically through the center of the upwardly extending end of elbow 24. The outer end, or elbow 25, of swivel joint 26 is rotatable about an axis B extending horizontally a short distance above the elbow 24 and intersecting the vertical axis A.

A straight, substantially rigid, fluid conveying conduit, or tube, 28 has its inner end securely attached in fluid conveying relation to the outer end of elbow 25. The conduit 28, when in the horizontal position as illustrated in FIGURE 2, extends outwardly beyond the pedestal 18. Since the conduit 28 is rigidly secured to the outer end of elbow 25, the conduit 28 is also rotatable, or pivotable, about a vertical and horizontal axis. However, it is desired to prevent the conduit 28 from ever touching the bed 16, either during use or when not in use.

To prevent the conduit 28 from rotating or pivoting below a horizontal plane P, which is parallel to and spaced from the bed 16, there is provided a circular track 30 mounted on the pedestal 18 by standards 32 suitably attached thereto. The center of the circular track is located at a point which coincides with the vertical axis A of rotation of the swivel joint 26. A pair of brackets 34 are attached to the conduit 28, and a skid member 36 is secured to the brackets 34 below the conduit in registration with track 30. Thus, the conduit 28 can pivot in any direction above the horizontal plane P, but cannot pivot below that plane because the circular track 30 defines an abutment surface which is engaged by the skid 36. Therefore, the conduit 28 can never contact the bed 16, and can never become buried in the sand nor worn by dragging across a rocky or sandy bed. In its lowermost position, the conduit 28 pivots or rotates about the vertical axis A, and the skid simply slides along the track to maintain the conduit in a horizontal position. The skid does not, however, prevent the conduit from pivoting upward away from the rail.

At the outer end of conduit 28 there is attached a fluid conveying swivel joint 38 comprising two 90° elbows 31 and 33. The inner end of elbow 31 is rotatably coupled to the outer end of conduit 28 by means of a rotatable fluid tight connector 35. The elbow 31 is thus rotatable about an axis C extending through the length of conduit 28. Elbow 33 is rotatably coupled to the outer end of elbow 31 by means of a rotatable fluid tight connector 37. The elbow 33 is thus rotatable about an axis D extending perpendicular to the axis C of rotation of elbow 31. The joint 38 defines a fluid conveying universal coupling which permits relative movement in any direction of elbow 33 relative to conduit 28.

A second, or intermediate, rigid fluid conveying conduit 40 is secured to the outer end of elbow 33 of swivel joint 38. The inner end of conduit 40 is rotatably attached to the outer end of elbow 33 by means of a suitable rotatable fluid tight connector (not shown) so that the conduit 40 is rotatable about its longitudinal axis E. At the outer end of conduit 40 there is rotatably attached a swivel joint 42 comprising two 90° fluid conveying elbows 39 and 41. The inner elbow 39 is rotatably attached to the outer end of conduit 40 by means of fluid tight rotatable connector 43. Thus the elbow 39 is rotatable about the longitudinal axis E of conduit 40. The outer 90° elbow of swivel joint 42 is rotatably attached to elbow 41 by means of fluid tight rotatable connector 45. Elbow 41 is thus rotatable about an axis F extending normal to the longitudinal axis of conduit 40, and the joint 42 therefore defines a fluid conducting universal coupling.

The inner end of the third, or terminal, rigid fluid conducting conduit 44 is rotatably attached to the outer end of elbow 41 by means of rotatable connector 47. The conduit 44 is rotatable about its longitudinal axis G. A swivel joint, or universal fluid conveying coupling 46 comprises 90° elbows 49 and 51. The inner end of elbow 49 is rigidly attached to the outer end of conduit 44. The elbow 51 is rotatably coupled to elbow 49 by means of a fluid tight rotatable coupling 53. This, elbow 51 is rotatable about an axis H extending normal to the longitudinal axis of conduit 44. The outer end of elbow 51 is provided with a connecting member, or flange, 48. The connecting flange 48 is rotatably connected to a connecting port 50 provided on a manifold 52 on the upper deck of the vessel. Terminal conduit 44 has a shut-off valve 60 (see FIG. 5) which seals the conduit when the conduit is disconnected from the vessel.

Thus, the rigid conduits 28, 40 and 44 are connected in end-to-end relationship by means of the swivel joints, or universal fluid conveying couplings, 38 and 42, to define an articulated line, indicated generally by numeral 66, which extends between the fixed conduit 20 leading to the on-shore installation and the connecting port 50 on the vessel. This line may convey any type of fluid, which, for purposes of this application, may be defined to include air, gas, liquid, powdered material, and any other material which can be sent through pipes. The swivel joints between the conduits permit the line to convey fluid to a moored vessel even though the vessels bobs and moves about within the limits, shown in FIG. 4, imposed by the lines (not shown) by which the vessel is moored.

Means is provided for rendering the two inner conduits 28 and 40 substantially weightless, or, preferably, buoyant. As shown in the drawings, conduit 28 is enveloped by a buoyant sheath 56 which may, preferably, be a coaxial tube surrounding the conduit and sealed to the conduit in fluid tight relation. The space between the tube and conduit is air filled thereby rendering the entire assembly buoyant. Or the buoyant means may be a low density solid or porous material such as wood or cork.

The total density of the buoyant sheath 56, conduit 28 and swivel joint 38, plus the highest density fluid which may be conveyed through the conduit, may be selected (by selecting a suitable outer diameter for sheath 56) to be substantially equal to, or less than, the density of water (sea or fresh water, depending on the location where the invention is installed). Thus, the conduit 28 will be in a buoyant condition whereby it is either substantially weightless or, preferably, is positively urged upward toward the surface of the water. The conduit 40 is provided with a buoyant sheath 58 similar to the sheath 56 on conduit 28.

Thus, the effective weight of the interconnected conduits and universal couplings is substantially reduced so that a relatively small hoisting mechanism aboard the floating vessel may be utilized to raise the fluid conveying line to connect terminal conduit 44 with connecting port 50. In addition, by reducing the effective weight of the apparatus, there will be less abrasive wear on the conduits, and the strain on the universal couplings as the conduits are moved about by motion of the vessel, is reduced.

A buoy 62, which floats on the body of water 14, is connected by cable 64 to the terminal conduit. In order to connect with the on-shore installation, to which conduit 20 leads, for loading or unloading, a vessel moors adjacent the buoy 62 and attaches a winch to the cable 64. The terminal end of line 66 is raised by the winch, and the terminal conduit 44 is attached to the connecting port 50 on the vessel. After the vessel is loaded, or unloaded, the connecting flange 48 is disconnected from the connecting port 50. Then, by means of the power winch and cable 64, the line 66 is lowered into the water until the terminal conduit 44 thereof, which is not buoyant, rests on the surface of the bed 16 as shown in dotted lines in FIGURE 2 and FIGURE 5.

As shown in dotted lines in FIGURES 2 and 5, the inner conduit 28 and intermediate conduit 40 will tend to float above the surface of the bed 16 when the articulated conduit 66 is not in use. It should be noted that the track 30 on pedestal 18 acts as an abutment surface which will keep conduit 28, and the conduit 40 connected thereto, off the bed 16 even if these two conduits should not be sufficiently buoyant to float. A typical position for a line 66 which is in use and is not sufficiently buoyant to float when filled with fluid, is illustrated in solid lines in the drawings. Even with a line not sufficiently buoyant to float when filled, there is virtually no chance that shifting mud, debris, or sand which may comprise a top layer of the bed 16, will build up or bury inner conduit 28 or intermediate conduit 40.

Thus, when lifting the terminal conduit 44 out of the water for connection to the vessel port, the hoisting winch is only called upon to overcome the effective weight of the outer conduit 44 and swivel joint 46, plus any resistance to lifting that may be due to sinking of the conduit 44 into the bed 16 or burying of the conduit 44 by shifting mud and debris, and a small additional weight if the rest of the line 66 is not completely buoyant. Further, it is to be noted that the articulated line 66 is held submerged well below the surface of the body of water by the terminal conduit 44, which is not buoyant, so that the likelihood of objects floating on the body of water 14 hitting and damaging the apparatus is substantially eliminated.

Although the best mode contemplated for carrying out the present invention has been herein shown and described, it will be apparent that modification and variation may be made without departing from what is regarded to be the subject matter of the invention as set forth in the appended claims.

I claim:
1. Apparatus for conveying fluid between a fixed conduit secured to the bed of a body of water and a connecting port on a vessel floating on the body of water, said apparatus comprising:
   (a) a first fluid conducting universal coupling connected to the fixed conduit,
   (b) a pedestal on the bed having an abutment surface surrounding said universal coupling, said abutment surface lying in a plane spaced from the bed,
   (c) a first rigid conduit connected to the universal coupling and extending therefrom over the abutment surface of the pedestal for universal movement above the plane of said abutment surface, said abutment surface preventing said first rigid conduit from lying on the bed,
   (d) a plurality of other rigid conduits for connection between the first rigid conduit and the connecting port on the vessel, said other rigid conduits connected in end-to-end relationship for swiveling movement therebetween, said other rigid conduits including a terminal conduit for connection to said connecting port on the vessel, and
   (e) buoyancy-imparting means attached to each of said rigid conduits except said terminal conduit.

2. Apparatus of claim 1 in which the abutment surface on the pedestal is a circular track and in which said first rigid conduit has a member connected thereto to engage the track.

3. Apparatus of claim 2 in which said member connected to said first rigid conduits is a skid member adapted to engage said circular track.

4. Apparatus of claim 1 in which said buoyancy-imparting means are buoyant sheaths on said rigid conduits.

5. Apparatus for conveying fluid between a fixed conduit secured to the bed of a body of water and a connecting port on a vessel floating on the body of water, said apparatus comprising:
   (a) a pedestal,
   (b) a fluid conducting universal coupling mounted on the pedestal and connected to the fixed conduit,
   (c) a circular track on the pedestal surrounding said universal coupling, said track lying in a plane parallel to and spaced from the bed,
   (d) a first rigid conduit having a buoyant sheath thereon, said first rigid conduit connected to the universal coupling and extending therefrom over the track for universal movement above the plane of said track, said first rigid conduit having a skid connected thereto for engagement with said track to prevent movement of said first rigid conduit below the plane of the track,
   (e) a terminal rigid conduit for connection to said connecting port on the vessel,
   (f) an intermediate rigid conduit having a buoyant sheath thereon, and
   (g) fluid conducting universal couplings to connect the rigid conduits in end-to-end relationship.

References Cited

UNITED STATES PATENTS

| | | | |
|---|---|---|---|
| 2,648,201 | 8/1953 | Marancik et al. | |
| 3,099,316 | 7/1963 | Johnson | 166—6 |
| 3,315,692 | 4/1967 | Arneson | 4—172 X |

HOUSTON S. BELL, JR., *Primary Examiner.*

U.S. Cl. X.R.

137—236; 248—49